United States Patent [19]

Wakerly

[11] Patent Number: 5,237,670
[45] Date of Patent: Aug. 17, 1993

[54] METHOD AND APPARATUS FOR DATA TRANSFER BETWEEN SOURCE AND DESTINATION MODULES

[75] Inventor: John F. Wakerly, Mountain View, Calif.

[73] Assignee: Alantec, Inc., Fremont, Calif.

[21] Appl. No.: 304,053

[22] Filed: Jan. 30, 1989

[51] Int. Cl.$^5$ .................. G06F 13/28; G06F 12/00
[52] U.S. Cl. .................. 395/425; 364/231.8; 364/242.3; 364/948.34; 364/230.4; 364/964.6; 364/942.4; 395/400; 395/275; 395/325
[58] Field of Search .................. 365/230.03; 364/200 MS File, 900 MS File; 395/425, 275, 400, 325

[56] References Cited

U.S. PATENT DOCUMENTS

| | | | |
|---|---|---|---|
| 3,820,079 | 6/1974 | Bergh et al. | 395/325 |
| 4,418,386 | 11/1983 | Vrielink | 395/325 |
| 4,864,496 | 9/1989 | Triolo et al. | 395/325 |
| 4,939,692 | 7/1990 | Kendall | 365/189.03 |

FOREIGN PATENT DOCUMENTS

| | | | |
|---|---|---|---|
| 0032634 | 3/1978 | Japan | 365/189.03 |
| 0002029 | 1/1979 | Japan | 365/189.03 |

OTHER PUBLICATIONS

μPD70320/322 (V25 TM) 16-Bit, Single-Chip CMOS Microcomputers, pp. 1-76, (NEC Electronics Inc., Sep. 1987).

Case et al., "Choosing Memory Architectures to Balance Cost and Performance," Microprocessor Reports, vol. 2, No. 9, pp. 6-9, (Sep. 1988).

*Primary Examiner*—Glenn Gossage
*Attorney, Agent, or Firm*—Skjerven, Morrill, MacPherson, Franklin & Friel

[57] ABSTRACT

A computer system is optimized to perform fast block transfers between modules that communicate over a multi-master global synchronous bus. Write operations are speeded up by a destination module sending a "ready-to-accept-data" signal before each write request. During a given clock period during which a source module delivers a data word to the bus, the destination module asserts this "ready" signal to indicate to the source module that the destination module is ready for the source module to deliver another word during another, subsequent clock period. The source module can deliver one word per clock period, and the destination module can receive one word per clock period. During a block write, only the starting address for the first word transferred is transmitted, with a counter at both source and destination modules counting each word transferred. Part of the address bus is not used for addresses and instead is used for data. Local memory is accessed in each module at the rate of one access per clock period. The bus performs one transfer per clock cycle, with successive transfers pipelined on the bus to minimize dead cycles.

13 Claims, 17 Drawing Sheets

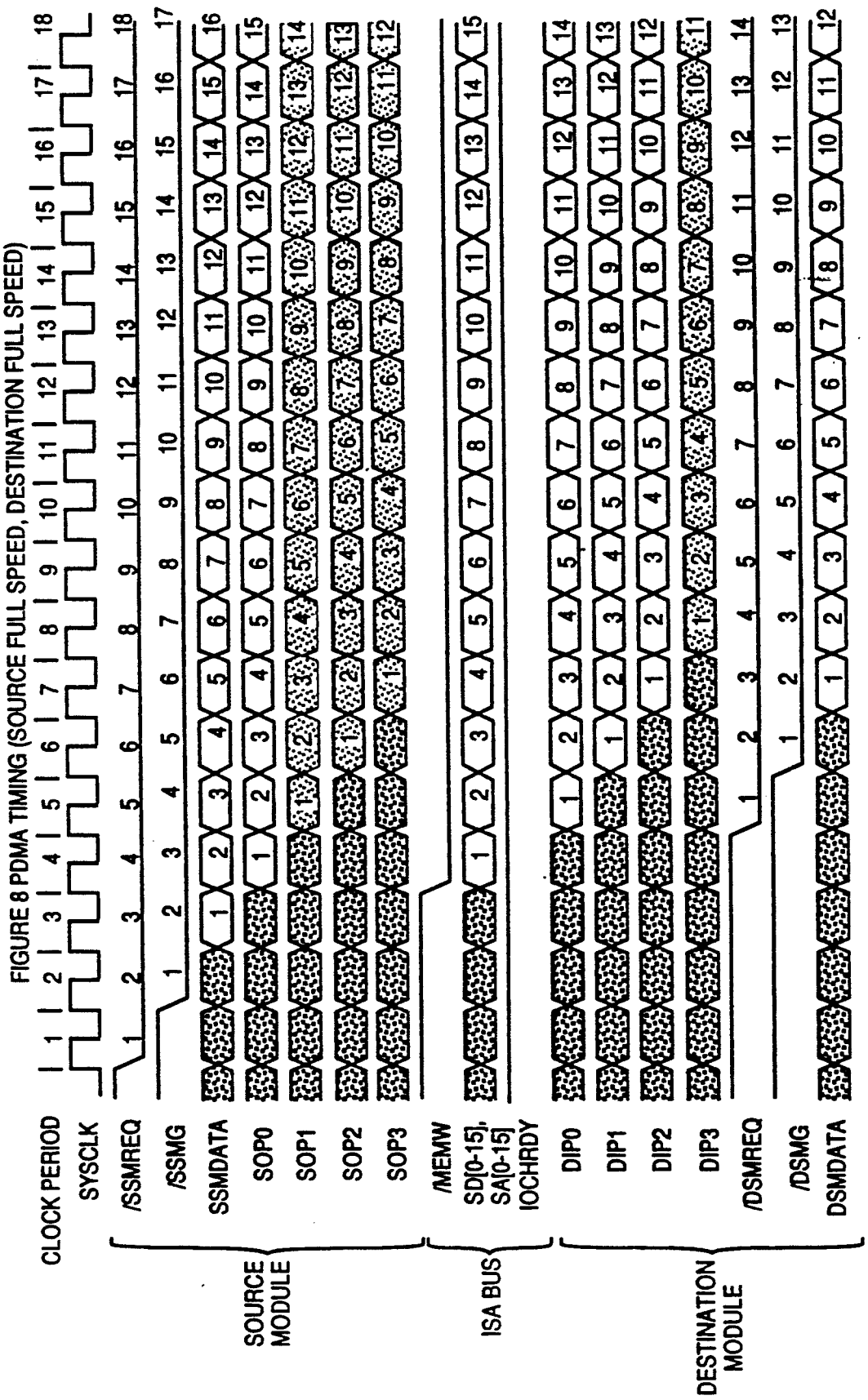

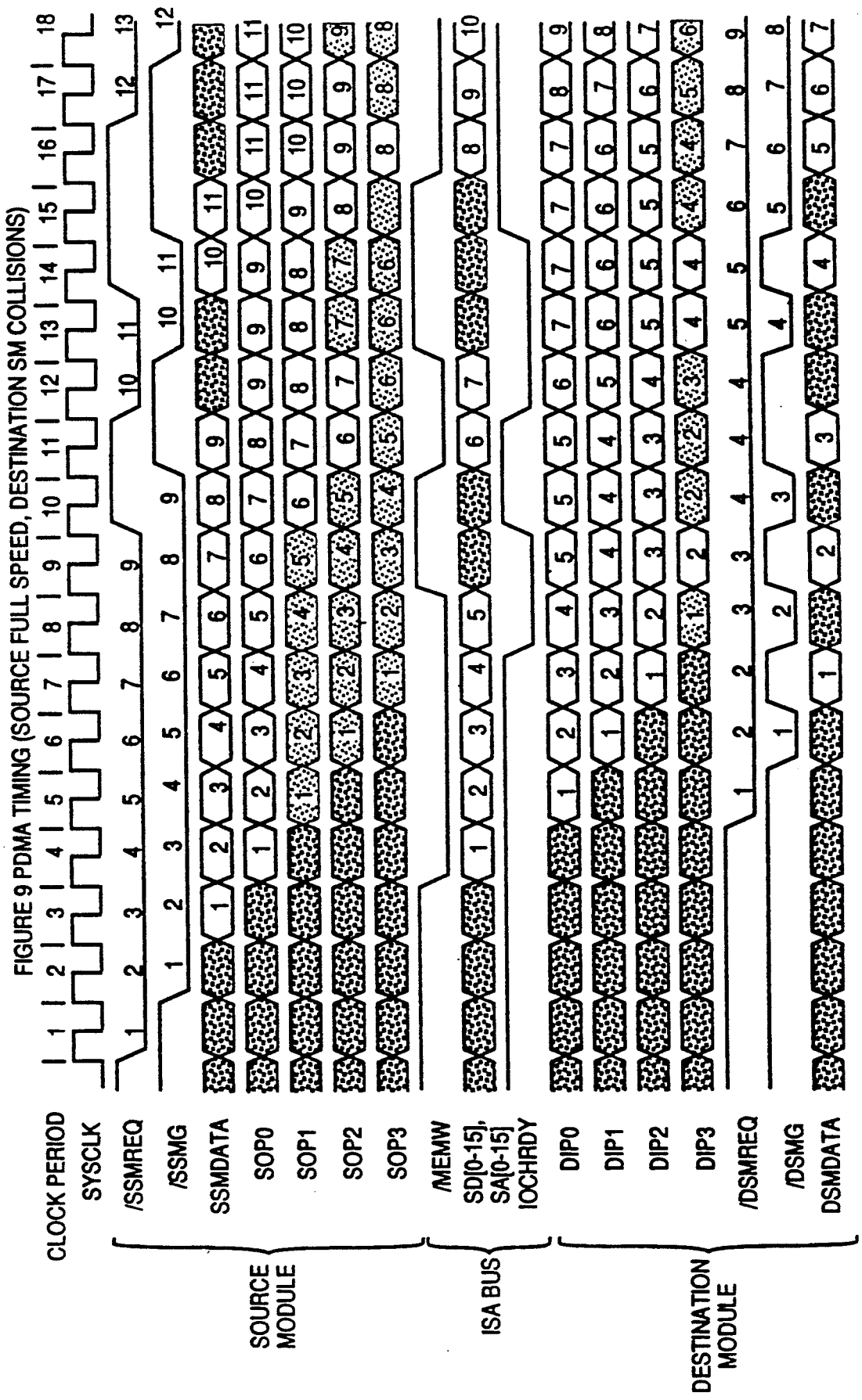

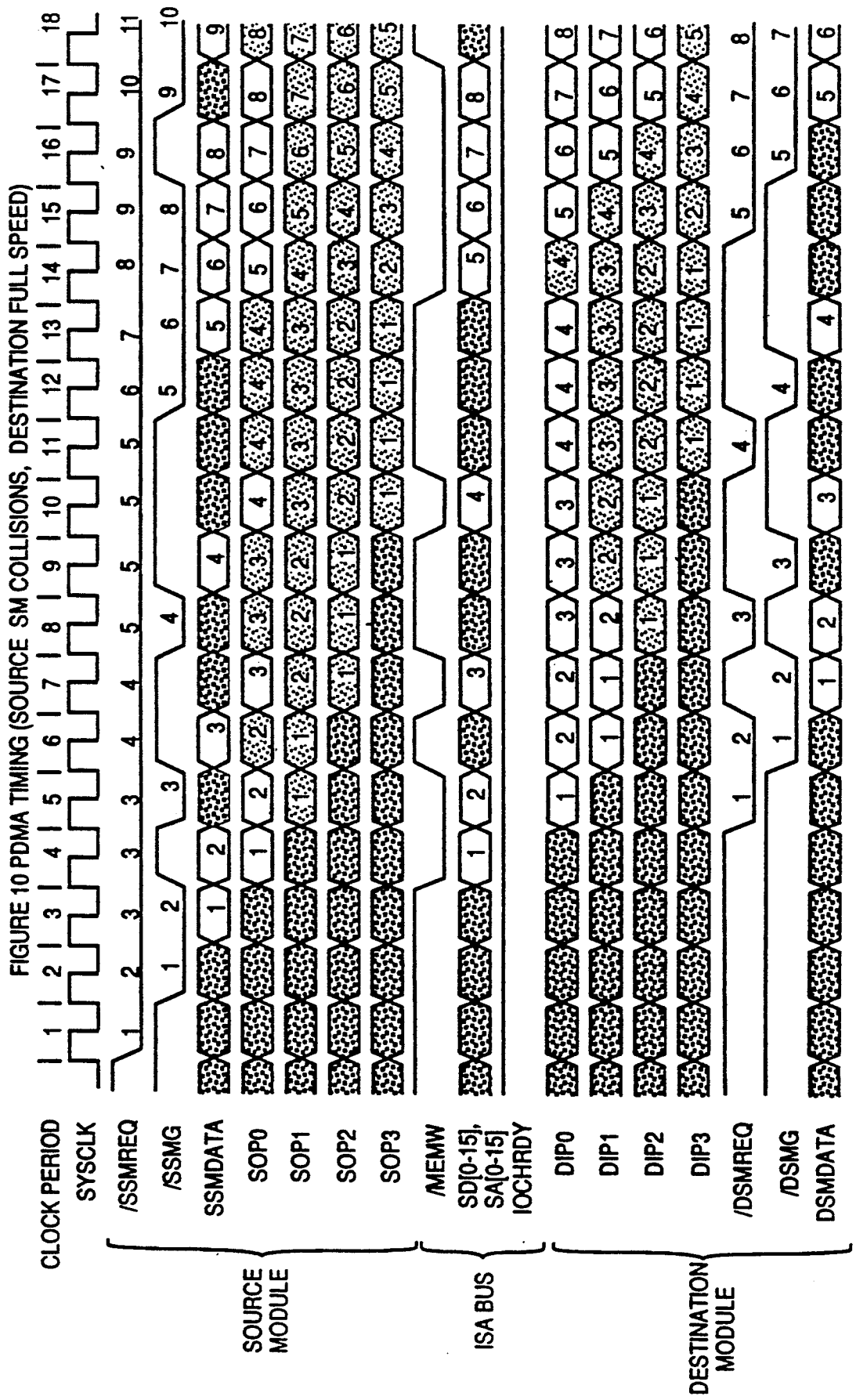

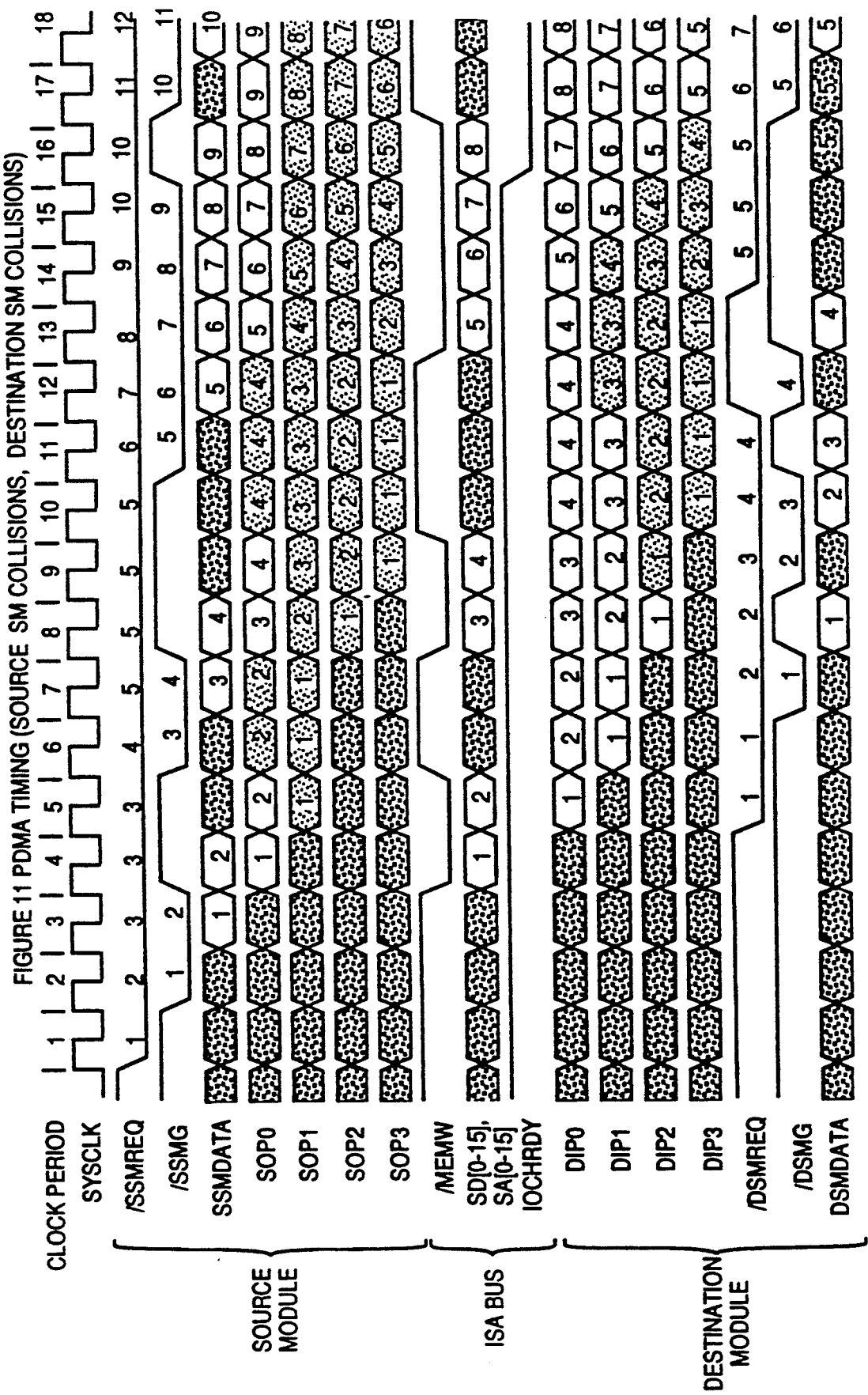

```
module SPIPE;
title 'PDMA Source Pipeline Control Logic
_SPIPE device 'P16R6';
```

"Input signals. Pin assignments may be changed"

```
SCLK        pin 1;
ENB_SPDMA   pin 2;   "This signal is provided by external control logic
                    " and is active only when source PDMA is enabled
IOCHRDY     pin 3;
!SSMG       pin 4;
```

"Output signals. Pin assignments may be changed."

```
!SSMREQ     pin 19;
!SPMT       pin 18;
SPS0,SPS1   pin 17, 16;
!SPSHIFT    pin 15;
!MEMW       pin 14;
```

"Field and expression definitions"
SPS = [SPS1,SPS0];

- SPS is an up/down counter that keeps track of the state of
- the source pipe as a number in the range 0-3.. When SPS=0,
- the pipe is empty or has one item (these two cases are
- distinguished by SPMT). When SPS=3, the pipe is full.
- Externally, SPS controls the output multiplexer of the
- pipeline. When SPS=0, the first register in the pipeline
- is selected. When SPS=1, the second register in the
- pipeline is selected, and so on.

- The following expressions define when to increment or
- decrement the SPS counter.

CNTUP = (SPSHIFT & !MEMW);    " Got a new word from SM and not
                              " getting rid of one by writing on bus.
CNTDN = (!SPSHFT & MEMW);     " Getting rid of a word by writing on
                              " bus, and not getting a new one from SM.
CNTHOLD = (!CNTUP & !CNTDN);" No net change in # of words in pipe.

- The following are the four possible values of SPS.

CNT0 = [0,0];
CNT1 = [0,1];
CNT2 = [1,0];
CNT3 = [1,1];

FIGURE 12A equations

SPSHIFT     := ENB_SPDMA & SSMG         " Got a source PDMA grant from SM.

SPMT    := !ENB_SPDMA                   " Default – pipe empty if not doing PDMA.
         # SPMT & !SPSHIFT              " Pipe already empty, and nothing new.
         # (SPS == 0) & MEMW & !SPSHIFT;
                                        " Pipe is about to become empty.

MEMW    := IOCHRDY & SPSHIFT            " Will have something in pipe to write.
         # IOCHRDY & ! (SPS == 0)       " At least two items in pipe.
         # IOCHRDY & !SPMT & (SPS == 0) & !MEMW;
                                        " One item in pipe, not currently being written.

SPS     := CNT0 & !ENB_SPDMA
         # CNT0 & ENB_SPDMA & (SPCNT == 0) & (!CNTUP # SPMT)
         # CNT0 & ENB_SPDMA & (SPCNT == 1) & CNTDN
         # CNT1 & ENB_SPDMA & (SPCNT == 0) & CNTUP & !SPMT
         # CNT1 & ENB_SPDMA & (SPCNT == 1) & CNTHOLD
         # CNT1 & ENB_SPDMA & (SPCNT == 2) & CNTDN
         # CNT2 & ENB_SPDMA & (SPCNT == 1) & CNTUP
         # CNT2 & ENB_SPDMA & (SPCNT == 2) & CNTHOLD
         # CNT2 & ENB_SPDMA & (SPCNT == 3) & CNTDN
         # CNT3 & ENB_SPDMA & (SPCNT == 2) & CNTUP
         # CNT3 & ENB_SPDMA & (SPCNT == 3) & !CNTDN;

SSMREQ = ENB_SPDMA & (SPS == 0)
                " 3 or 4 unused words left in source pipe.
       # ENB_SPDMA & (SPS == 1) & MEMW
                " 2 words left, and getting another this cycle.
       # ENB_SPDMA & (SPS == 1) & !SPSHIFT
                " 2 words left, and not using one this cycle.
       # ENB_SPDMA & (SPS == 1) & !SSMG
                " 2 words left, and not using one next cycle.
       # ENB_SPDMA & (SPS == 2) & MEMW & !SPSHIFT;
                " 1 word left, getting another, and not using one this cycle.
       # ENB_SPDMA & (SPS == 2) & MEMW & !SSMG
                " 1 word left, getting another, and not using one next cycle.
       # ENB_SPDMA & (SPS == 2) & !SPSHIFT & !SSMG
                " 1 word left, and not using one this cycle or next..
       # ENB_SPDMA & (SPS == 3) & MEMW & !SPSHIFT & !SSMG
                " 0 words left, but getting one this cycle,
                "        and not using one this cycle or next.

end SPIPE;

FIGURE 12B

```
module DPIPE;
title 'PDMA Destination Pipe Controller
_DPIPE device 'P16R4';

"Input signals. Pin assignments may be changed."

SCLK        pin 1;
ENB_DPDMA   pin 2;       " This signal is provided by external control logic
                         " and is active only when destination PDMA is enabled.
!MEMW       pin 3;
!DSMG       pin 4;

"Output signals. Pin assignments may be changed."

!DSMREQ     pin 19;
!DPSHIFT    pin 18;
DPS1, DPS0  pin 17, 16;
!DPNOTMT    pin 15;
!DPSMCYC    pin 14;
!OCHRDY     pin 12;

"Field and expression definitions"

DPS = [DPS1, DPS0];

"       DPS is an up/down counter that keeps track of the state of
"       the destination pipe, as a number in the range 0-3.. When
"       DSP=0, the pipe is empty or has one item (these two cases are
"       distinguished by DPNOTMT). When DPS=3, the pipe is full.
"       Externally, DPS controls the output multiplexer of the
"       pipeline. When DPS=0, the first register in the pipeline
"       is selected. When DPS=1, the second register in the
"       pipeline is selected, and so on.

"       The following expressions define when to increment or
"       decrement the DPS counter.

CNTUP = (MEMW & !DPSMCYC);      " Got a new item from bus and
                                "   not writing one into the SM.
CNTDN = (DPSMCYC & !MEMW)       " Writing an item into SM and not
                                "   getting a new one from the bus.
CNTHOLD = (!CNTUP & !CNTDN);    " No net change in pipe.

"       The following are the four possible values of DPS.

CNT0 = [0,0];
CNT1 = [0,1];
CNT2 = [1,0];
CNT3 = [1,1];
```

FIGURE 13A equations

DPSHIFT = ENB_DPMA & MEMW;  " Got a destinstion PDMA word on bus.

DPSMCYC := DSMG;  " Current SM cycle is for destination PDMA.

DPNOTMT := ENB_DPDMA & MEMW  " Putting something into the pipe.
 # DPCNT > 0  " More than one item in pipe already.
 # DPNOTMT & (DPCNT == 0) & !DSMCYC;
  " just one item in pipe, but not writing it into SM.

DPS := CNT0 & !ENB_DPDMA
 # CNT0 & ENB_DPDMA & (DPS == 0) & (!CNTUP # !DPNOTMT)
 # CNT0 & ENB_DPDMA & (DPS == 1) & CNTDN
 # CNT1 & ENB_DPDMA & (DPS == 0) & CNTUP & DPNOTMT
 # CNT1 & ENB_DPDMA & (DPS == 1) & CNTHOLD
 # CNT1 & ENB_DPDMA & (DPS == 2) & CNTDN
 # CNT2 & ENB_DPDMA & (DPS == 1) & CNTUP
 # CNT2 & ENB_DPDMA & (DPS == 2) & CNTHOLD
 # CNT2 & ENB_DPDMA & (DPS == 3) & CNTDN
 # CNT3 & ENB_DPDMA & (DPS == 2) & CNTUP
 # CNT3 & ENB_DPDMA & (DPS == 3) & !CNTDN;

DSMREQ = (DPS ==0) & DPNOTMT & !DPSMCYC & !DSMG
  " 1 word in pipe, no writes granted.
 # (DPS ==1) & !DSMG
  " 2 words in pipe, at most one write granted.
 # (DPS==1) & !DPSMCYC
  " 2 words in pipe, at most one write granted.
 # (DPS >1)
  " 3 or more words in pipe.

!IOCHRDY = (DPS == 2) & !DSMCYC & !DSMG; "Pipeline is almost full,
  " and no space will be freed this cycle or next..
 # (DPS == 3) " Pipeline is full.

end DPIPE;

FIGURE 13B

METHOD AND APPARATUS FOR DATA TRANSFER BETWEEN SOURCE AND DESTINATION MODULES

BACKGROUND OF THE INVENTION

1. Field of the Invention

This invention relates to a device and method for performing high-speed block data transfers between modules connected to an input/output (I/O) bus in a computer system.

2. Description of the Prior Art

Several high-performance computer applications transfer a large volume of data between local memories on modules connected by a common, multimaster I/O bus (i.e., a global bus). In such an application, each module can act as a bus master, that is, it can temporarily take over the bus and directly read or write information in any other module which acts as a slave. Examples of such applications include the following:

1. Multiport LAN bridge or router. Each module connects to an external local area network (LAN). Packets arriving at each module are temporarily stored in a local memory on the module. Eventually, packets are forwarded to local memories on other modules, which then forward them to the destination LAN.
2. Multimedia, multiclient file server. One or more modules connect to physical disk drives or other mass storage devices. Other modules connect directly to clients or to shared media (such as LANs) for communicating with clients. File transfers require data to be moved between local memory in the storage-device modules and local memory in the client modules.
3. High-performance distributed-processing workstation. A workstation may contain several processors, each tailored for a specific task. For example, a workstation may have one processor for running an operating system or user "shell", another for performing three-dimensional graphics transformations, and yet another for managing a graphics display. One way to structure such a workstation is to provide a local memory for each processor and to move data from one local memory to another as required for each processor to use the data.

Each of these applications simply requires blocks of data to be moved from one module's local memory to another's. In each case, the global bus provides the connection between modules. Either the source module becomes bus master and writes the block of data to the destination memory, or the destination module becomes bus master and reads the block from the source as follows.

In the prior art, when a bus master requests for a read operation to take place, address, data, and control information flows in two directions:

1) The bus master sends a "read request" signal and an address to the slave.
2) The slave reads the data from its memory at the specified address.
3) The slave sends the data back to the bus master, along with an acknowledgment signal.

In the prior art, a write operation limits the two-way communication between the master and slave:

1) The bus master sends a "write request" signal, an address, and data to the slave.
2) The slave writes the data into its memory at the specified address.
3) The slave sends an acknowledgment signal back to the bus master.

In general, high-performance applications require block transfers on the global bus to be made as quickly as possible, in order to minimize the following effects:

1. Data transfer delay. Most applications require data to be transferred as quickly as possible, because the recipient of the data has nothing to do but wait until it receives the data. Examples are file transfers and packet transfers.
2. Processing overhead. Data transfers on the global bus may delay unrelated processor operations on the sending and/or receiving modules, because the processor may need access to the bus in order to fetch and execute instructions. Examples are any module whose processor does not have a local instruction/data memory or cache.
3. Bus contention. Even if modules have local memories or caches, they may be delayed at times if they need to use the global bus to access an I/O port or other bus-connected resource at the same time that the bus is being used for a block transfer. In addition, other, pending block transfers cannot even begin until the current one completes. For example, a module that is performing local processing may be blocked while trying to read a global flag or send a message on the global bus.

Many different computer I/O bus structures are known in the art. They can be roughly grouped into two categories:

Synchronous bus. A common clock signal, generated at a central point, is distributed to all modules connected to the bus. All control signals and responses are timed with respect to the clock signal. Likewise, data and address setup and hold times are specified with respect to the clock. Synchronous buses include Multibus, the ISA bus (part of the Industry Standard Architecture for the IBM (International Business Machines, Armonk, N.Y.) PC/AT computer), and the recently proposed EISA (Extended Industry Standard Architecture) bus.

Asynchronous bus. This bus has no common clock signal; bus timing is specified relative to the edges of control signals generated by the modules. The PDP-11 Unibus computer is an example from the minicomputer era. More recently, Motorola adopted an asynchronous control approach in the 68000 microprocessor, which was then formalized in the VME bus.

A synchronous bus has simpler control logic and is the natural choice for single-processor (single-bus-master) systems in which the bus clock is simply the processor clock or a derivative of it. On the other hand, it is conventionally believed in the art that an asynchronous bus potentially gives better performance in systems with multiple bus masters.

The conventional argument for better performance with asynchronous buses is as follows. First, assume that the bus must support a wide variety of bus master types and operation speeds (since the processor technology keeps changing). Then, with a synchronous bus, each bus master and slave must synchronize with the bus clock, and a module-to-module transaction on the bus requires two synchronizations. Each synchronization requires an average of 50–100 ns to perform. Part of the synchronization time is the average delay until the next local-processor or bus clock edge (50 ns with a 10 MHz clock) and part of it is the metastability settling time for the synchronizing flip-flops (25 ns is needed with the very best flip-flops).

With an asynchronous bus, no synchronization to the bus or a fixed rate clock is required. Instead, each module on the bus is prepared to deal with asynchronous control signals at any speed up to a predefined maximum. When two processors communicate, one processor generates control signals synchronously with its local clock at its fastest available rate, and the other synchronizes with its own local clock. Only one synchronization occurs, and it takes place at the speed of the destination processor.

With a synchronous bus, total bus bandwidth is calculated as the product of the bus clock frequency and the number of data bits per transfer (word length), divided by the number of clock periods per transfer. Thus, there are three ways to increase the bandwidth of a synchronous bus:

1. Increase the clock frequency.
2. Increase the word length of the data bus.
3. Decrease the number of clock periods per transfer.

For example, the ISA bus has a 6 MHz clock, a 16-bit data bus, and uses 3 clock periods for a typical transfer. Thus, its bandwidth for typical transfers is 32 Mbits/sec. It is desirable to have much higher bandwidths than this.

SUMMARY OF THE INVENTION

Synchronous Global Bus

The chief object of the present invention is to perform fast block transfers between local memories that communicate over a multi-master global bus. Attaining this object requires a choice between synchronous and asynchronous approaches.

The local memory on each module in a typical system is a multiport memory with at least two ports—the global bus interface and a local processor. Additional ports may be provided for I/O device interfaces (e.g., LAN chips or disk controllers). To achieve high speed, the local memory may be built with large, fast, static random-access memory (RAM) chips. Such chips are available with access times in the 15-70 ns range.

As explained above, synchronization times on an asynchronous bus are in the 50-100 ns range, and are twice as long as this on a synchronous bus. In either case, bus synchronization times are longer than the memory access time and thus have the most damaging effect on memory-to-memory block transfer speed.

Therefore, in accordance with the present invention, to speed up block transfers, the module-to-bus synchronization time is reduced to zero. This requires a synchronous bus in which the local memories are synchronized to the bus clock, thus eliminating the need for module-to-bus synchronization. With such an architecture, it is possible to achieve one memory-to-memory transfer per bus clock cycle.

Read vs. Write

As described above, there are two possible ways to transfer a block of data from module A to module B in the type of system under consideration. Either module A can become bus master and write the block of data to module B, or module B can become bus master and read the block from module A.

In accordance with the present invention, the bus master performs a write operation and the order of prior art steps (2) and (3) as described above are exchanged. That is, the slave sends a "data accepted" signal to the master before it has actually finished (or perhaps even started) writing the data into memory. Thus in accordance with the present invention, the system sends an acknowledgement before executing the acknowledged command. So, the round trip delay for a transaction is limited to the time that it takes for the slave to detect and respond to the master's "write request" signal, independent of the time that it takes to actually perform a write operation in memory.

Going one step further, in accordance with this invention the round trip delay for the control signals is completely eliminated by pipelining. Instead of generating a "data accepted" signal after each write request, the slave generates a "ready to accept data" signal before each write request, guaranteeing that the data will be accepted immediately.

Write operations have another important advantage over read operations in that broadcast operations are facilitated, so that a single block of data may be transferred from a single source module to multiple destinations. This is useful in the multiport LAN bridge or router application, where a broadcast requirement is inherent. Of course, a data block could be sent to N destinations by performing N individual block transfers, but this consumes N times the bus bandwidth. It is far more efficient for such a data block to appear on the global bus only once, and for each destination to read the data at that time. The control of such an operation is performed most effectively by the source module; a broadcast operation is therefore structured as a special case of a block write.

To combine pipelining with the broadcast write capability, in accordance with the present invention each destination module generates its own "ready to accept data" signal, and the source module sends data only when all destinations are ready.

Addressing

In the prior art, the bus master tells the slave an address for each transfer that it performs. However, individual transfers during a block transfer typically go to successive memory addresses. Therefore, during a block transfer, a slave module only needs to know the starting address for the transfer. This address may be loaded into a counter that is incremented for each individual transfer, so the counter always contains the address for the current transfer.

Therefore, in accordance with the present invention, during a block write, the master (source) module maintains a source-address counter, and the slave (destination) module maintains a destination-address counter. Each counter is initialized to an appropriate address in the corresponding local memory before a block transfer begins, and is incremented for each word transferred.

Number of Clock Periods per Transfer

As stated previously, in accordance with the present invention, the best performance is achieved with a synchronous bus and memory. The best cost/performance ratio is achieved if the memory performs one access (read or write) per clock period, and likewise the global bus performs one transfer per clock. In order to run the memory and the bus at the fastest possible speed without "dead" cycles, data pipelining is used. The control signals are also pipelined, so that the maximum clock speed is limited not by control logic delays, but by memory speeds and data bus delays. The pipelined data transfer path from source module 10 to destination module 11 is illustrated in FIG. 1.

In accordance with the present invention, the memory access occurs in one clock period, as does the transfer from the pipeline 12 in the source module to the pipeline 13 in the destination module. Once a particular data word is read from memory 14 on the source module 10, several clock periods elapse before that word is written into the destination module's memory 15. However, with pipelining, several words are always "in the pipe", so that once the pipeline is filled, a new word is written into the destination 11 during every clock period.

If the source 14 and destination 15 memories are slower than the data bus, techniques such as memory interleaving are optionally used to match the memory bandwidth to the bus bandwidth. For example, if a memory access required two clock periods, then two banks of memory are provided, with successive accesses going to alternate banks.

Bus Width

It is possible to achieve an even higher bandwidth for block transfers. During a block transfer, the source and destination modules in accordance with the present invention keep track of addresses using counters that are incremented once for each word transferred. Since addresses need not be transferred between source and destination modules, in accordance with the present invention, it is possible to use the address bus as an auxiliary data bus during block transfers. For example, consider an implementation using the ISA bus of the PC-AT computer.

The ISA bus, as is known in the art, contains a 16-bit data bus and a 24-bit address bus. During block transfers, in accordance with the present invention the eight high-order bits of the address bus are used to select a destination module, while the sixteen low order bits of the address are treated as "don't-cares". Thus, the destination module conceptually occupies 64 Kbytes ($2^{16}$ bytes) of address space on the bus. Since the low-order address bits are not decoded when the destination module is selected, they can be used for something else—such as data, as explained below.

The word "segment" as used herein denotes the 64 Kbyte region of the address space selected by a particular combination of the eight high-order address bits. Each destination module on the ISA bus is assigned a segment at which it will accept block transfers. Note that this segment does not correspond to "real" (i.e., physical) memory, it is simply a range of addresses decoded by the destination module. When the destination module receives a write command to any address in this segment, it writes the data in local memory at an address specified by the destination-block-address counter, and it increments the counter. The local memory may be larger or smaller than 64 Kbytes, and the destination address in local memory is totally independent of the value of low-order address bus bits during the transfer.

Since the 16 low-order address bus bits are "don't-cares" from the point of view of the destination module's address decoding, they can be used for data. The memories on the source and destination modules can be 32 bits wide, so 32 bits are transferred during each clock period—16 bits on the data bus and 16 bits on the low-order address bus.

With the ISA bus, the block transfer bandwidth using this scheme is 6 MHz times 32 bits per transfer, or 192 Mbits/sec. If the bus clock speed is pushed to 10 MHz (as is possible through other aspects of the invention), the bandwidth is 320 Mbits/sec which is an improvement of a factor of ten over the prior art.

BRIEF DESCRIPTION OF THE DRAWINGS

FIGS. 8, 9, 10 and 11 show timing charts for transfers in accordance with the present invention.

FIGS. 12A and 12B and 13A and 13B show the pipeline control logic equations in accordance with the present invention.

Identical numbers in various figures denote identical or similar structures.

DETAILED DESCRIPTION OF THE INVENTION

The above described aspects of the present invention are implemented in the preferred embodiment in a method and device called Pipelined Direct Memory Access (PDMA). PDMA is described below in the preferred embodiment, which is in the context of the well known ISA bus.

Definition of Bus Signals

Figure 2:
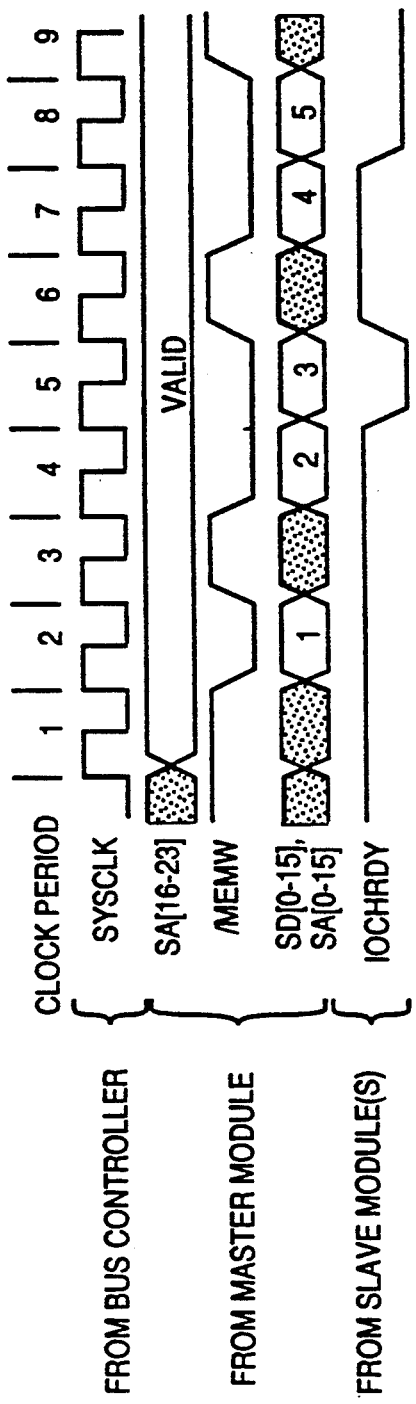
FIG. 2 shows address, data and control signals in accordance with the present invention.

PDMA uses signals (as shown in FIG. 2) that are a subset of the physical signals defined for the ISA bus. However, the logical behavior of these signals as listed below is defined differently for PDMA than it is for conventional ISA operation.

SYSCLK The system clock signal, generated at one place and distributed to all the modules in the system. Clock frequency is in the range of 6-10 MHz in current ISA bus implementations.

SD[0-15] The system data bus. The source module drives data onto this bus during PDMA transfers. A particular data word is present on this bus for just one period of SYSCLK.

SA[0-23] The system address bus. During PDMA transfers, the source module drives SA[16-23] with the segment number of the destination module(s); this value is stable during the entire PDMA transfer. Since address lines SA[0-15] are not decoded, the source module may drive SA[0-15] with data, similar to data on SD[0-15]. A particular data word is present on this bus for just one period of SYSCLK. (Actually, the ISA bus defines signal lines SA[0-19] and LA[17-23]. The LA lines have different timing than SA lines for normal transfers. However, the definitions made here are independent of these differences.)

/MEMW Memory write signal. The source module drives this signal during PDMA transfers. A low signal (logic 0) indicates that write data is present on SD[0-15] and (optionally) SA[0-15] and must be accepted during this clock period.

IOCHRDY Ready signal. Destination modules drive this signal during PDMA transfers. A high signal (logic 1) indicates that the destination module (or modules, in the case of broadcast write operations) will be able to accept a word of data during the next clock period. This is an open-collector line so that, in the case of broadcast, any destination module can pull it low (to logic 0) to prevent a write from occurring in the next clock period.

Note that a prefix of "/" on a signal name indicates an active-low signal. On such signals, a value of logic 0 means "true", indicating that the named action should occur. Other signals are active-high, so that logic 1 is true. A signal is said to be asserted when it is set to its active level, and negated when set to the opposite level. As known in the art, the choice between active-low and active-high signals is a matter of implementation convenience and does not affect the behavior of the system. Active levels are chosen in this description in a way consistent with conventional design practices.

FIG. 2 shows an example of the behavior of these signals. A PDMA block transfer begins during clock period 1, with the source module driving SA[16-23] with the segment number of the destination module for the duration of the transfer. For broadcast write operations, a special "broadcast" destination segment number is used, such that all destination modules (and possibly even the source module itself, acting also as a destination) respond.

In the example of FIG. 2, the source module writes its first word, during clock period 2, by asserting /MEMW and placing the word on SD[0-15] and SA[0-15]. It is allowed to do so because IOCHRDY was asserted during the preceding clock period. The destination module accepts (reads in) the data word at the end of clock period 2.

During clock periods 3-5, the source module is allowed, but not obligated, to write additional words to the destination module(s), and in fact it elects to write only during clock periods 4 and 5. During clock period 5, one or more destination modules negate IOCHRDY, so that the source is not allowed to write during clock period 6.

IOCHRDY is asserted during clock periods 6 and 7, so the source module is allowed to, and does in fact, write during clock periods 7 and 8. IOCHRDY is negated during clock periods 8 and 9, which prevents writes during clock periods 9 and 10.

For the ISA implementation on the PC-AT computer, PDMA transfers either 16-bit words (on SD[0-15]) or 32-bit words (on SD[0-15] and SA[0-15]). As an optional cost-saving measure, only the 16-bit option is provided on certain modules. Theoretically, a control signal on the bus could be used to select between 16- and 32-bit transfers. However, since no such control signal is available in the ISA bus, a different approach is preferred. Each destination module has two segments (actually, ranges of addresses determined by particular values of SA[16-23]) at which it will accept PDMA transfers, one segment for 16-bit transfers and the other for 32-bit transfers.

Properly designed non-PDMA devices on the ISA bus should not be affected by PDMA operations. The segment address value on SA[16-23] during PDMA operations ensures that such devices are not selected and so they ignore the other signals. The means by which a source module becomes bus master is not described here; a variety of conventional means are possible.

Shared Memory Implementation

The shared memory (SM) local to each module is shared between the global bus and devices on the module, such as processors and high-speed I/O interfaces, that also need direct access to the memory. As explained previously, the SM is synchronized to the bus clock, and can be accessed (read or written) once per clock period.

Figure 1:
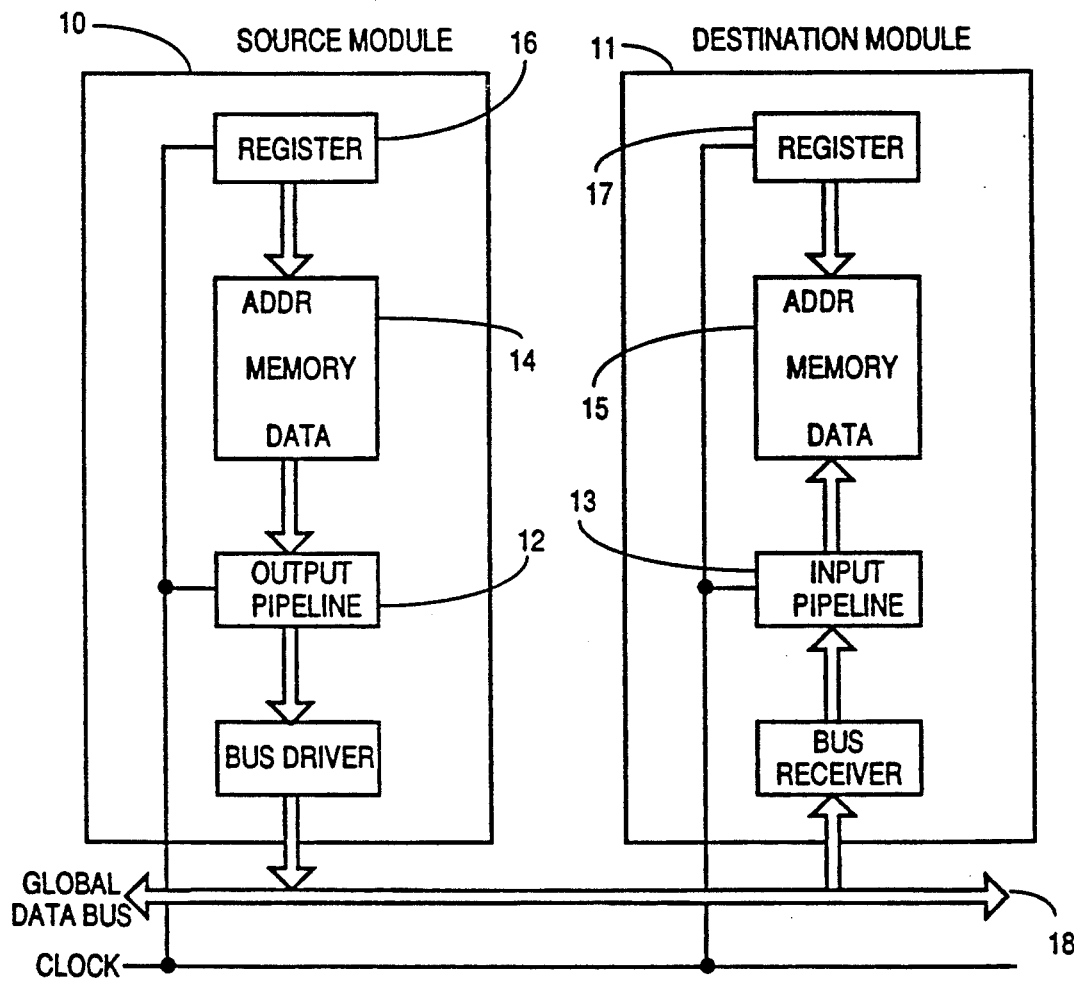
FIG. 1 shows two modules connected by a synchronous global bus in accordance with the present invention.
Figure 3:
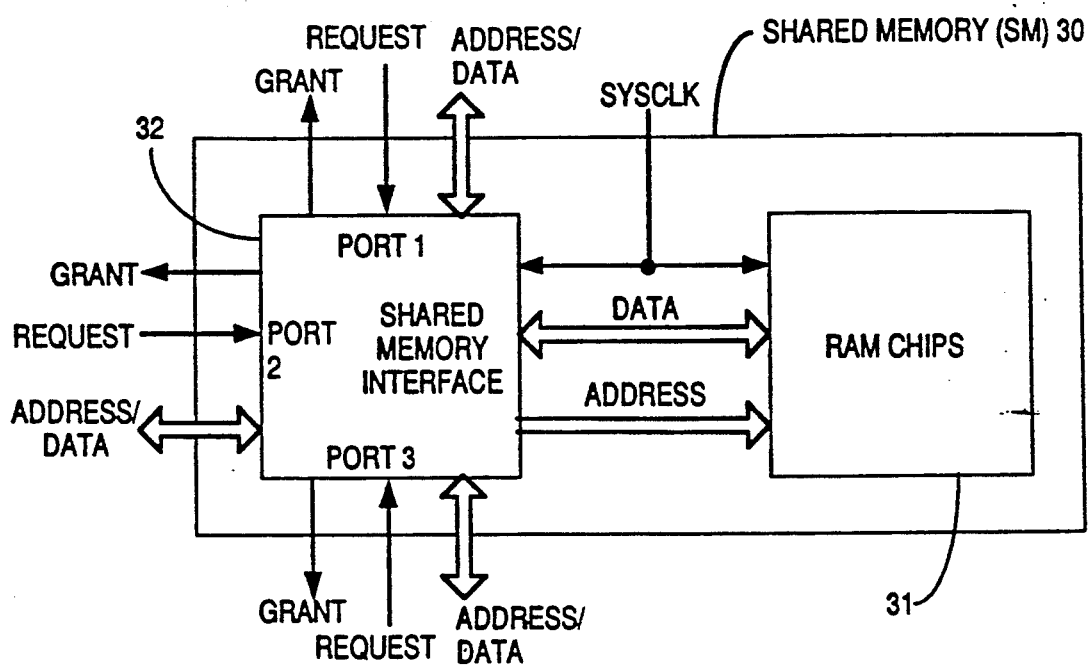
FIG. 3 shows a shared memory structure in accordance with the present invention.

FIG. 3 shows a block diagram of a shared memory 30 (SM) with three ports (port 1, port 2, port 3); one of these ports, such as port 1, is connected through the pipeline registers 12,13 as shown in FIG. 1 to the global bus 18 for PDMA accesses. Each port, port 1, port 2, port 3 (see FIG. 3), has an associated "request" line whereby the control logic for that port requests access. The shared memory interface 32 has arbitration logic (not shown) that accepts requests from the ports and issues "grant" signals at each clock period to indicate which port, if any, may access the SM. A port must complete several steps to access the shared memory:

1) Request access.
2) Wait for access to be granted.
3) Generate address and control signals for memory access.
4) Access the memory (read or write).

In principle, a port can accomplish all of these steps during a single clock period, assuming that no other port is requesting memory access during that same clock period. However, significant combinational logic delays are associated with steps 1-3 above. For example, in typical technologies, the logic circuits that request access, arbitrate among requests, and generate access control signals may each be implemented with a programmable array logic (PAL) circuit having a delay of 25 ns, for a total delay of 75 ns. The memory (RAM) chips 31 themselves (used in step 4 above) may have an access time of 70 ns, so that the minimum clock period needed to accomplish all four steps is 145 ns, more than twice the access time of the memory chips 31 themselves.

Figure 4:
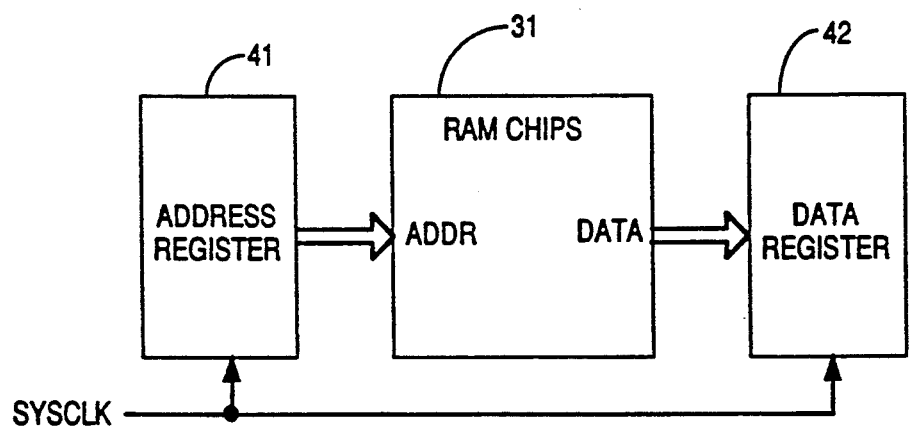
FIG. 4 shows an interface to memory chips for pipelined access in accordance with the present invention.

An alternative to the above-described single-clock embodiment is a pipelined implementation in which requests, arbitration, and control signal generation are performed one or more clock periods before the actual memory access occurs. As shown in FIG. 4 this allows for a very fast and simple interface to the memory (RAM) chips 31 themselves. An address is clocked into the address register 41 at the very beginning of a SYSCLK clock period. A RAM 31 read operation can begin shortly thereafter, as soon as the output of the address register 41 is valid, and the RAM data is saved in the data register 42 at the very end of the clock period. The minimum clock period for this configuration is the sum of the RAM's 31 access time, the address register's 41 clock-to-output delay, and the data register's 42 input-to-clock setup time. In the typical electronic technologies, the total for the last two items is on the order of 20 ns, much less than the 75 ns for three stages of combinational logic (PALs) in a nonpipelined implementation. Write operations may be pipelined similarly, with the address and data being presented at the very beginning of the clock period, and the data being latched into the RAM chips 31 at the very end.

A key element in a pipelined memory interface is to perform the slowest step, the actual RAM chip 31 access, in a single clock period with no "overhead" operations before or after the RAM access itself. Once this is done, there are many different ways to allocate clock periods before the RAM access step (step #4 above) to the other required steps (steps #1, 2, and 3 above). The number of stages in a pipelined implementation is the number of clock periods that it takes for a given operation to be completed. If the delays for the request, arbitration, and control logic are relatively short compared to RAM access time, a two-stage pipelined embodiment is provided in which all of the preliminary steps occur in the single clock period immediately preceding the RAM access. Alternatively, if these steps are slow, a four-stage, fully pipelined embodiment is provided in which each step has its own clock period. Even more stages might be used if steps 1-4 above were subdivided further or partitioned differently.

Figure 5:
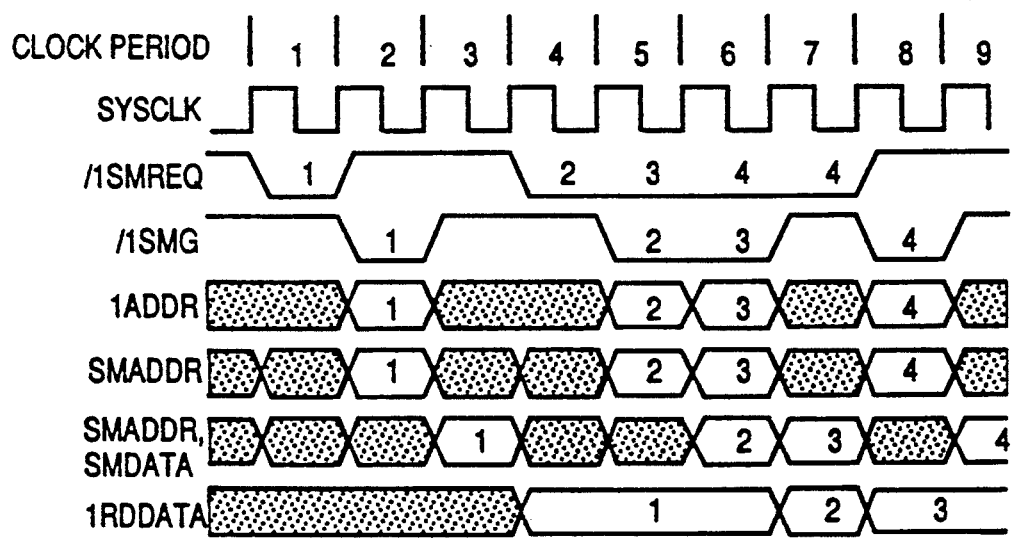
FIG. 5 shows operation of a three staged pipelined shared memory in accordance with the present invention.
Figure 6:
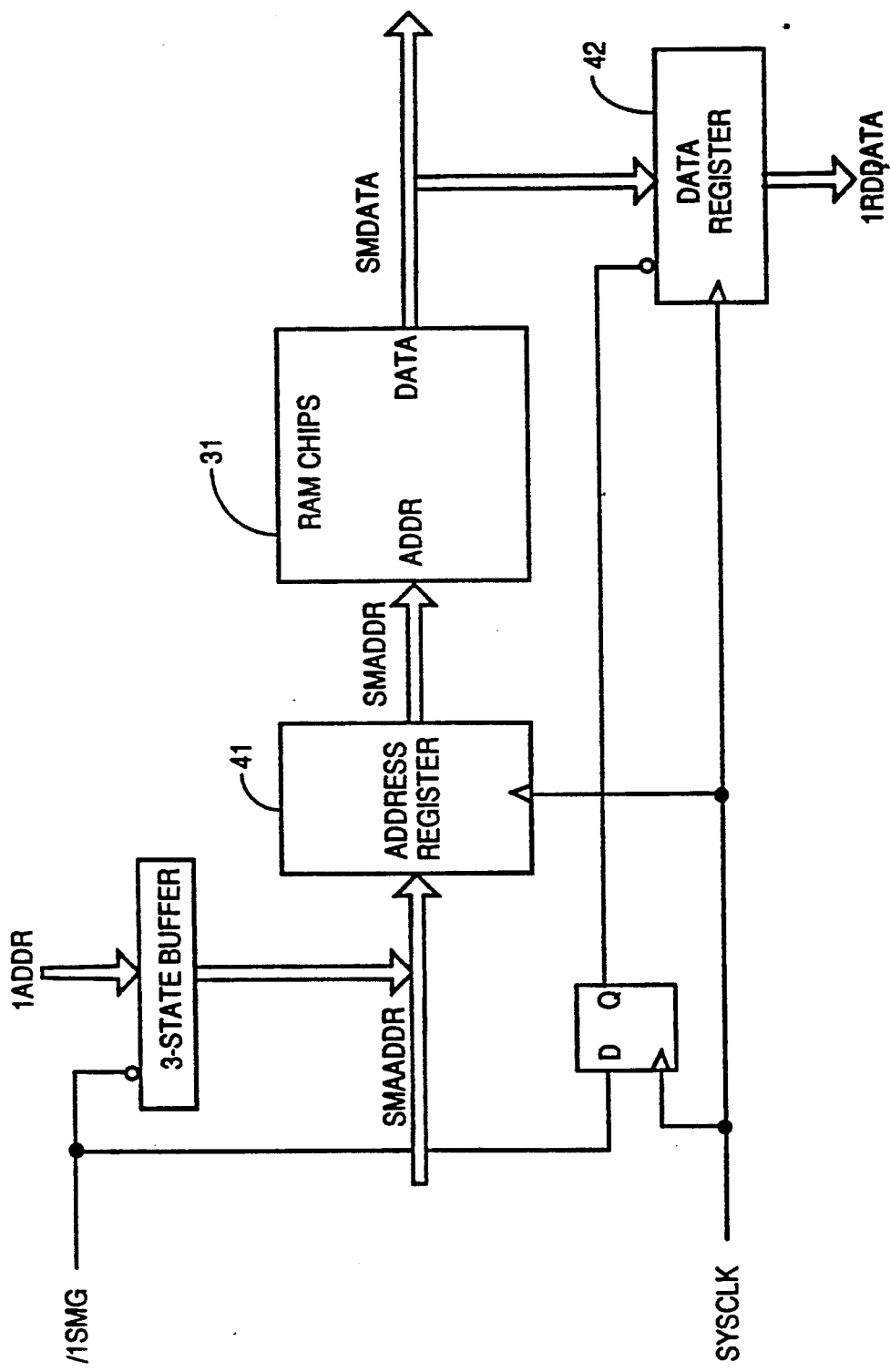
FIG. 6 shows the port structure of a three stage pipelined shared memory in accordance with the present invention.

As an example, FIG. 5 shows the timing for read operations in one port of a three-stage (i.e., three clock periods) pipelined implementation. Here step 1 is performed during clock period n, steps 2 and 3 occur during clock period n+1 (assuming access is granted immediately), and step 4 occurs during clock period n+2. The corresponding address and data circuits for a single port ("Port 1") are shown in FIG. 6 for the three stage pipelined implementation.

The following signals are used in this embodiment:
SYSCLK The system clock signal.
/1SMREQ Shared memory request signal from port 1. Control circuits for port 1 assert this signal (i.e., set it to 0) at the beginning of a clock period to request access.
/1SMG Shared-memory grant signal for Port 1. A shared-memory arbiter circuit looks at the request signals for all ports during clock period n, and asserts the grant signal for at most one port at the beginning of clock period n+1 to indicate that access has been granted for the following clock period (n+2). A value of 0 on /1SMG indicates that access has been granted to Port 1.
1ADDR Port 1 address. This bus contains the address at which Port 1 wishes to access shared memory.
SMAADDR Shared-memory advance address. During clock period n+1, this bus contains the address at which shared memory will be accessed during clock period n+2. As shown in FIG. 6, the grant signal /1SMG is used to gate 1ADDR onto SMAADDR when access has been granted to Port 1. A similar technique may be used to generate memory-chip 31 control signals, such as read/write, chip selects, and so on, that depend on the grant signals and must be stable for the entire clock period during which the memory is accessed. Such control signals may be generated combinationally during clock period n+1, and used as input to registers that apply stable values to the RAM chips 31 during clock period n+2.
SMADDR Shared memory address. This bus contains the actual address that is applied to the RAM chips 31 throughout clock period n+2, the address at which memory is accessed.
SMDATA Shared memory data. This bus contains the data that is read out of the memory during a read cycle, or written into the memory during a write cycle. Only the logic and timing for read cycles are illustrated in FIGS. 5 and 6, but write cycles are similar.
1RDDATA Port 1 read data. This bus is the output of a register containing the data that was most recently read out of the shared memory on behalf of Port 1. The register is loaded from SMDATA at the end of clock period n+2 only if /1SMG was 0 during clock period n+1, that is, only if Port—1 access was granted for clock period n+2.

Pipeline Registers

As suggested above several clock periods of delay may occur from the time that a port requests access to the SM until the SM operation (read or write) is completed. Therefore, several stages of pipelining are needed to deliver data to, or receive data from, the global bus at the rate of one transfer per clock period.

Referring to FIG. 1, the input 13 and output 12 pipelines, unlike the shared memory, contain registers that are dedicated to the global bus 19 interface. That is, the source pipeline 12 can deliver a word to the global data bus 19 during any clock period, and likewise the destination pipeline 13 can accept a word from the bus during any clock period. Each pipeline 12,13 has a first-in, first-out (FIFO) behavior, that is, it preserves the order of the data written into and read out of it. The pipelines 12,13 are controlled by the following strategies:

Source pipe 12 The source-pipe control circuitry normally requests and uses every available shared-memory (SM) cycle to read data from the SM and puts it into the source pipe. It stops requesting SM cycles only if the source pipe 12 is full or about to become full. The source pipe control circuitry delivers a word to the global bus 19 whenever the source pipe 12 is nonempty and the bus 19 is able to accept a word (i.e., IOCHRDY was asserted during the previous clock period).

Dest. pipe 13 The destination pipe control circuitry puts every word that appears on the global bus 19 into the destination pipe 13. It negates IOCHRDY if the destination pipe 13 is full or about to become full.

The destination pipe control circuitry normally requests and uses every available shared-memory (SM) cycle to take data out of the destination pipe 13 and write it into the SM. It stops requesting SM cycles only if the destination pipe 13 is empty or about to become empty.

Figure 7:
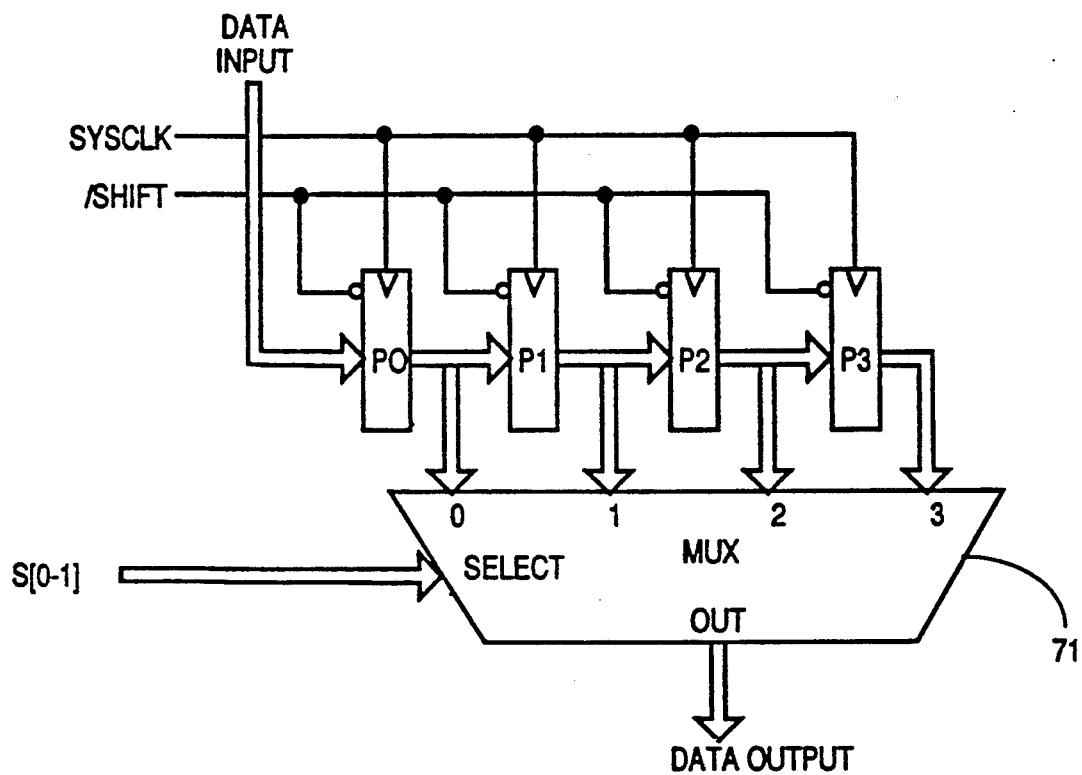
FIG. 7 shows a pipeline register structure in accordance with the present invention.

As a specific example, an embodiment in which the source 12 and destination pipes 13 are each four words deep is as follows. FIG. 7 shows the structure of a pipeline; it contains four registers (P0, P1, P2, P3) and a four-input multiplexer 71. At the end of each clock period, existing data in the pipe is shifted one stage (i.e., register) and new data is loaded into the first stage from the data input if and only if /SHIFT is asserted. At all times, the data output of the pipeline is the output of one of the four stages P0-P3, as selected by the 2-bit value on the select inputs, S[1-0]. The pipeline control logic generates signals /SHIFT and S[1-0].

Pipeline Control During PDMA Transfers

FIG. 8 is a system timing diagram for PDMA transfer, including source and destination modules and the global bus (which in this embodiment is an ISA bus).

The following signals, buses and registers are included in FIG. 8:

SYSCLK The system clock signal, generated at one place and present on the ISA bus and all modules.

Source module signals:

/SSMREQ Shared-memory (SM) request, active-low.
/SSMG SM grant, active-low.
SSMDATA SM data bus, a word being read from the SM.
SOP0-SOP3 Output pipeline register 0, 1, 2, 3.

Global bus (ISA bus) signals:

/MEMW Memory write, active-low. Indicates that write data is present on bus during the current clock cycle.
SD[0–15], SA[0–15] Data to be written
IOCHRDY Ready signal, active-high. Indicates that a write operation is allowed during the next clock cycle.

Destination module signals:

DIP0-DIP3 Input pipeline register 0, 1, 2, 3.
/DSMREQ Shared memory (SM) request, active low.
/DSMG SM grant, active-low.
DSMDATA SM data bus, a word being written into the SM.

Clock periods are numbered across the top of the drawing in FIG. 8. The other numbers identify the word being transferred; for example, /DSMREQ is asserted during the clock period 7 to request a destination SM cycle to write word 3 of the block transfer. Shaded regions indicate register or bus contents whose values are unknown or "don't care." In particular, numbered, shaded regions in the pipeline registers (SOP[0-3] and DIP[0-3]) indicate data words that have already been used and will not be used again.

FIG. 8 depicts the case including the assumption that both the source and destination SM's are able to grant all of their cycles to the PDMA pipelines, so that once the pipes are filled, a block transfer proceeds at full speed, one clock period per word transferred. As shown, seven clock periods elapse from when the first source SM request is made (during clock period 1) until the requested word is written in the destination (during clock period 7).

Not all of the pipeline registers are used in the case of FIG. 8, because both source and destination operate at full speed. FIG. 9 shows a case where the source module is able to provide SM cycles to the source pipe with no waiting, but the destination module has other ports contending for the SM. Therefore, the destination pipeline must sometimes wait one or more extra clock periods to get an SM cycle (e.g., /DSMG is not asserted during clock periods 7, 9, 11, 12 and 14). In this case, the destination pipe is allowed to fill up, until the destination module is eventually forced to negate IOCHRDY (in clock periods 8 and 9, and again in 12-14) to prevent the destination pipe from overflowing. When this happens, the source pipe continues to fill for a while, but the source module must eventually negate /SSMREQ (in clock periods 10-11, and again in 14-16) to prevent the source pipe from overflowing.

FIG. 10 shows a case where the destination module is able to provide SM cycles to the destination pipe with no waiting, but the source module's output pipe is unable to get all the SM cycles it wants without waiting. In this case, both the source and destination pipes run near empty. Notice that the destination module requests SM cycles (via /DSMREQ) only when new data is present in the destination pipe.

FIG. 11 shows a case where both the source and the destination modules must occasionally wait for SM access.

Pipeline control equations

The pipeline control strategy described above and shown in FIGS. 8 through 11 is formalized in a set of logic equations for the source and destination pipeline control logic, and may be implemented using programmable array logic (PAL) circuits. These equations are shown in FIGS. 12A, 12B and 13A, 13B as written in ABEL, an industry-standard language for defining the operation of such circuits.

Note that some of the PAL outputs of FIGS. 12A, 12B and 13A and 13B are combinational (as indicated by an "=" in the defining equation), and some are registered (as indicated by ":="). In particular, the SSMREQ, DSMREQ, IOCHRDY, and DPSHIFT signals are combinational, and their new values appear in the middle of each clock cycle, shortly after their input values are stable. All other signals are registered, so their values change only at the end of each clock cycle.

Pipeline Control Timing

The pipeline control logic in accordance with the present invention minimizes control-signal propagation delay. For example, consider the requirements of the SM's arbitration logic. During each clock period, the arbitration logic looks at requests (/SMREQ) from its ports and issues a grant signal (/SMG) to indicate which port may access the SM. Therefore, the system's minimum clock period may be limited by the time that it takes for the SPIPE or DPIPE PAL to generate /SSMREQ or /DSMREQ. To minimize the delay of these signals, they are formulated in terms of signals that are generated locally on the corresponding module at the beginning of the clock period.

For example, /SSMREQ is a function of EN-B_SPDMA, SPS[1-0], /MEMW, /SPSHIFT, and /SSMG, which are all registered outputs, generated on the source module, that become valid at the very beginning of each clock period. Likewise, /DSMREQ is a function of DPS[1-0], /DPNOTMT, DPSMCYC, and /DSMG, which are all registered outputs, generated on the destination module, that become valid at the very beginning of each clock period.

Optionally, additional information could have been used in the request equations to obtain better pipeline and SM performance, where performance is defined as the number of clock periods required for a given block transfer. For example, the /DSMREQ equation could be modified to "look ahead" and generate an SM request whenever /MEMW is asserted, rather than wait until the corresponding word has been stored in the pipe (refer to the first line of the DSMREQ equation). As a result, a block transfer could complete one clock period sooner than it would have without lookahead. However, since /MEMW is generated on the source module and may experience significant bus delays before reaching the destination module, including such a term in the /DSMREQ equation could increase the minimum system clock period and thereby increase the overall block transfer time. Similarly, the /SSMREQ equation on the source module could look ahead based on the value of IOCHRDY received from the destination module, but again this could increase the minimum system clock period.

Similar reasoning results in the equation for IOCHRDY itself on the destination module. This equation assumes that the source module may or may not assert /MEMW during the current clock period, so that the destination pipe must always have an empty slot available for the word that may be written during this clock period. Theoretically, better bus utilization could be achieved (i.e., IOCHRDY negated less often) if the IOCHRDY equation looked at /MEMW to determine whether or not the source module really is writing a word during the current clock period, but again this would make the delay for IOCHRDY dependent on the bus delay of /MEMW. Since the source module itself looks at IOCHRDY to determine the next value of /MEMW, the result would be a round-trip bus delay from source to destination to source to generate /MEMW. Instead, the control equations are structured so that no control signal must propagate through a round trip path between source and destination modules during a single clock period.

Figure 14:
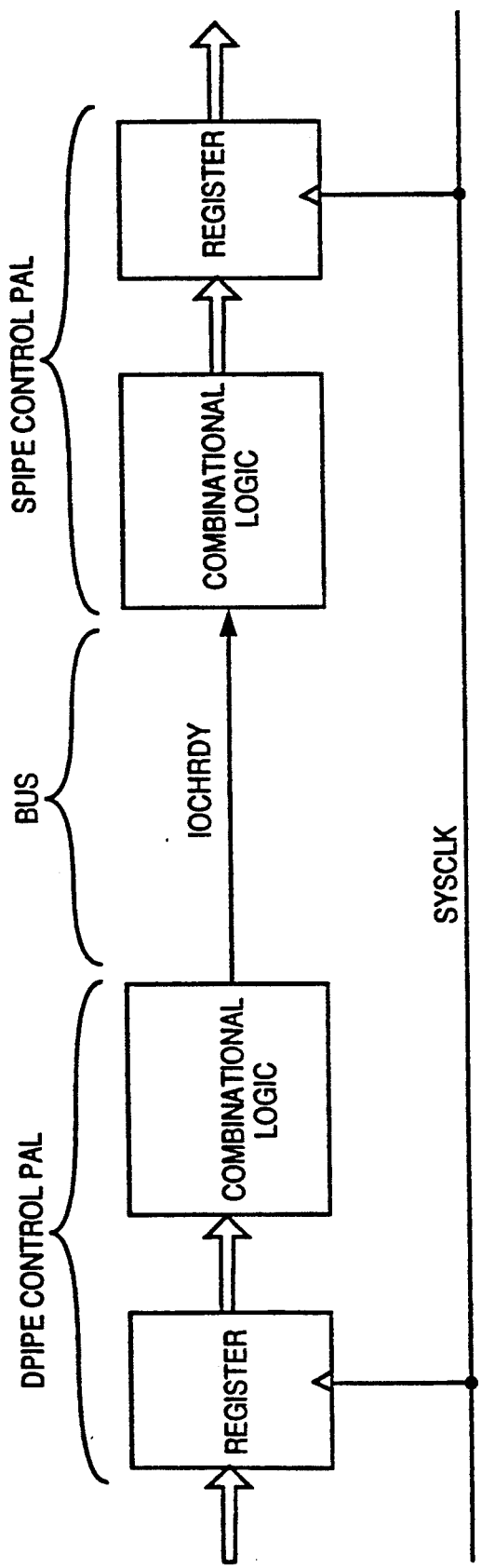
FIGS. 14, 15 and 16 show the worst case signal propagation paths in accordance with the present invention.
Figure 15:
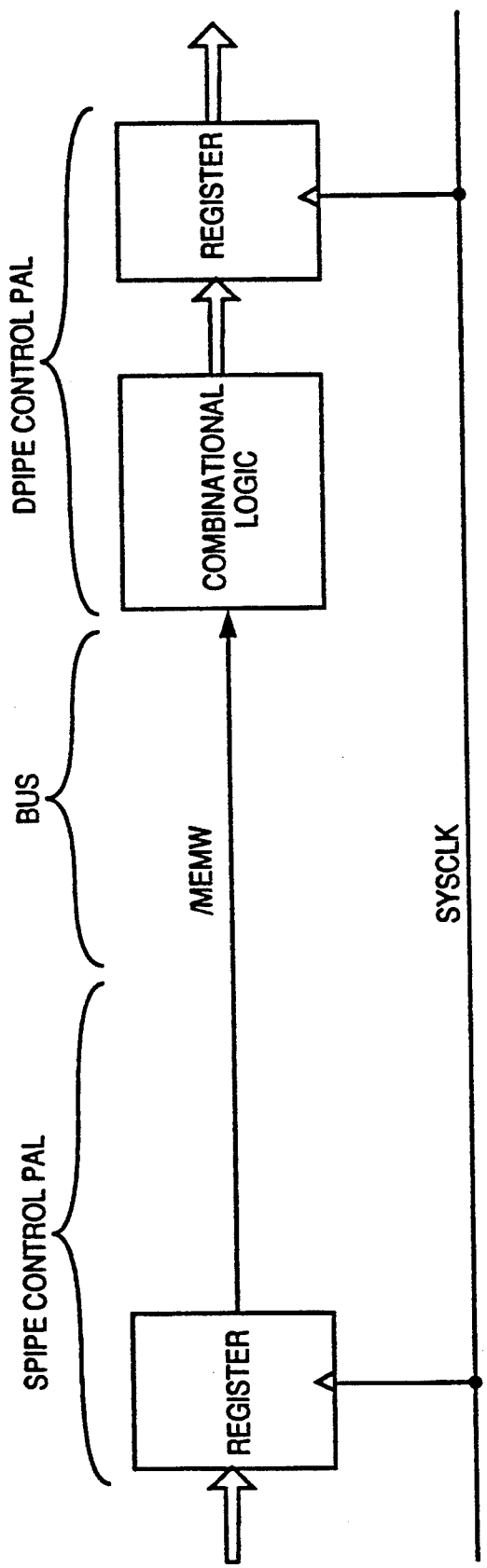
Figure 16:
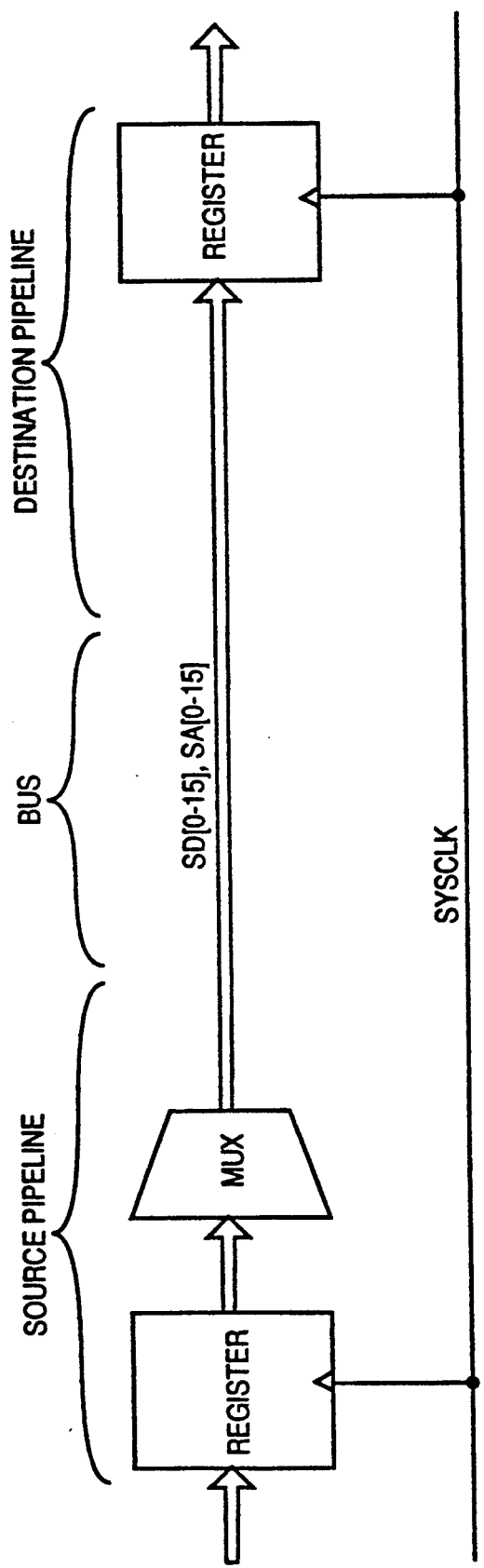

FIGS. 14–16 summarize the worst-case signal propagation paths in the preferred embodiment of PDMA. In each figure, "Bus" delays encompass bus driver and receiver delays as well as propagation delays on the physical bus. FIG. 14 shows the IOCHRDY worst-case propagation delay path. FIG. 15 shows the /MEMW worst-case propagation delay path. FIG. 16 shows the BUS worst-case propagation path. The longest propagation delay is for IOCHRDY (FIG. 14) which is generated combinationally by DPIPE on the destination module and also goes through combinational logic before affecting the registered outputs on SPIPE on the source module.

Pipeline Timing Improvements

The fundamental definitions of the PDMA control signals (/MEMW and IOCHRDY) allow the timing to be further improved in other embodiments of the invention, so that both PDMA control signals and data would experience only a register-to-bus-to-register delay. This requires IOCHRDY output to be registered, and requires a dedicated data pipeline register following the multiplexer in the source pipeline. In addition, faster system clock speeds may also force a higher degree of pipelining in the shared memory, so that the /SSMREQ and /DSMREQ outputs are also registered. Most of the SPIPE and DPIPE equations would be restructured to contain additional lookahead terms. The lengthening of control and data pipeline delays also suggest a corresponding increase in depth for the source and destination data pipelines to achieve optimal performance.

While the above modifications to the preferred embodiment affect the complexity of individual modules and the performance of the bus, they do not change the logical definitions of the bus signals. As a result, it is possible to intermix, in one system, modules with different internal data and control pipeline structures. However, the system clock speed must be slow enough for proper operation of "slow" modules (ones with the delay characteristics of FIGS. 14–16). For fastest possible system clock operation, all modules must have the fully pipelined control and data structure suggested in the previous paragraph.

Note also that it is consistent with the invention to have other types of clocks, such as a multiphase clock. In this case, a single clock period might include a first phase for register propagation delays, a second phase for combinational logic, and a third phase for set up.

The above description of the invention is illustrative and not limiting; other embodiments of the invention will be apparent to those skilled in the art in light of the teachings of this invention.

I claim:

1. A system comprising:
   n modules M1, . . . , Mn, n being an integer greater than or equal to 2 (two);
   an address bus connecting the modules;
   a data bus connecting the modules; and
   address generating means for generating addresses for said modules M1, . . . , Mn;
   wherein:
   (1) in a first type of data transfer in which one or more words are transferred in sequence from said module M1 to one or more of said modules which are destination modules, said address bus provides, to said one or more of said modules, addresses at which said one or more words are to be written in said one or more of said modules; and
   (2) in a second type of data transfer in which a plurality of words W1, . . . , Wk are transferred in sequence from said module M1 to one or more of said modules which are destination modules, k being an integer greater than 1 (one), when each word W of said words W1, . . . , Wk is being transferred:
      (i) said address generating means provides, to the one or more of said modules which are destination modules, an address at which the word W is to be written in the one or more of said modules which are destination modules; and
      (ii) at least part of said address bus transfers at least part of said word W to the one or more of said modules which are destination modules and is not used for providing addresses to the one or more of said modules which are destination modules.

2. The system of claim 1, further comprising clock means for generating a clock signal, and wherein signals on the address bus and the data bus are synchronized with the clock means.

3. The system of claim 1, wherein, for each data transfer of said first type and each data transfer of said second type, the one or more of said modules which are destination modules assert a signal indicating readiness to accept data before module M1 begins to transfer data to the one or more of said modules which are destination modules.

4. The system of claim 1 wherein said address generating means comprises an address counter.

5. The system of claim 1, wherein, in said second type of transfer, said module M1 is a bus master.

6. The system of claim 5 wherein
   the module M1 generates address signals representing module addresses on the address bus, and wherein the type of transfer being performed is a function of the address signals.

7. The system of claim 6, wherein said address signals can select a particular group of modules to be destination modules and can select a broadcast data transfer of said second type.

8. The system of claim 1 wherein said address bus comprises one or more address lines which carry, during each data transfer of said first type and each data transfer of said second type, a number identifying the one or more of said modules which are destination modules.

9. The system of claim 8 wherein at least one module M of said modules M1, . . . , Mn is identified by:
(1) a first identifying number in a transfer in which said module M is the only destination module; and
(2) a second identifying number in a broadcast transfer in which said module M is a destination module, and said second identifying number also identifies all other destination modules in said broadcast transfer.

10. The system of claim 8 wherein:
in a third type of data transfer in which a plurality of words WW1, . . . , WWm are transferred in sequence from said module M1 to one or more of said modules M1, . . . , Mn, wherein m is an integer greater than 1 (one), when each word WW of words WW1, . . . , WWm is being transferred:
(1) said address generating means provides, to the one or more of said modules which are destination modules, an address at which the word WW is to be written in the one or more of said modules which are destination modules; and
(2) said at least part of said address bus is not used for providing addresses, or for transferring data, to the destination modules;
and
in said second and third types of transfer, a number identifying the one or more of said modules which are destination modules also identifies the type of transfer being performed.

11. The system of claim 8 wherein, for a module M which is one of modules M1, . . . , Mn:
(1) in a first transfer of data words of a first size to said module M, said module M is identified by a first identifying number; and
(2) in a second transfer of data words of a second size to said module M, wherein said second size is greater than said first size, said module M is identified by a second identifying number which is different from said first identifying number.

12. The system of claim 11 wherein:
said first size is 16 bits; and
said second size is 32 bits.

13. A method of transferring k data words W1, . . . , Wk, k being an integer greater than 1 (one), from a source module to one or more destination modules, said source module being connected to said one or more destination modules by an address bus and a data bus, said method comprising the steps of:
determining whether to transfer said data words using a first type of transfer or a second type of transfer, and then transferring said data words by said first type of transfer or said second type of transfer as determined by said determining step, wherein:
(1) said first type of transfer comprises, for each word W of said words W1, . . . , Wk, the steps of:
providing, on said address bus, an address at which the word W is to be written in said one or more destination modules;
delivering the word W from said source module to said data bus; and
receiving the word W by said one or more destination modules; and
(2) said second type of transfer comprises the steps of:
providing to a counter in each of said one or more destination modules, an address at which said word W1 is to be written in said one or more destination modules;
transferring said word W1 from said source module to said one or more destination modules; and,
for each word Wj, $2 \leq j \leq k$, in sequence:
incrementing the counter in each of said one or more destination modules so as to obtain, in the counter in each of said one or more destination modules, an address Aj at which said word Wj is to be written in said one or more destination modules, and providing said address Aj to said one or more destination modules;
delivering, if a size of said word Wj is not larger than a size of said data bus, said word Wj from said source module to said data bus, or,
if the size of said word Wj is larger than the size of said data bus, delivering a part of said word Wj from said source module to said data bus and delivering another part of said word Wj from said source module to at least part of said address bus; and
receiving said word Wj by said one or more destination modules;
wherein said at least part of said address bus does not provide, to said one or more destination modules, said address Aj at which said word Wj is to be written in said one or more destination modules.

* * * * *

UNITED STATES PATENT AND TRADEMARK OFFICE
CERTIFICATE OF CORRECTION

PATENT NO. : 5,237,670
DATED : August 17, 1993
INVENTOR(S) : John F. Wakerly

It is certified that error appears in the above-identified patent and that said Letters Patent is hereby corrected as shown below:

IN THE DRAWINGS

Fig. 5, change "SMADDR" (first occurrence) to --SMAADDR--.

Fig. 12B replace a double period ("..") by a single period (--.--).

Fig. 13B replace a double period ("..") by a single period (--.--).

Signed and Sealed this

Twenty-seventh Day of September, 1994

Attest:

Attesting Officer

BRUCE LEHMAN

Commissioner of Patents and Trademarks